Jan. 3, 1967 D. SCARAMUCCI 3,295,550
SWING-TYPE CHECK VALVE
Filed March 2, 1964 2 Sheets-Sheet 1
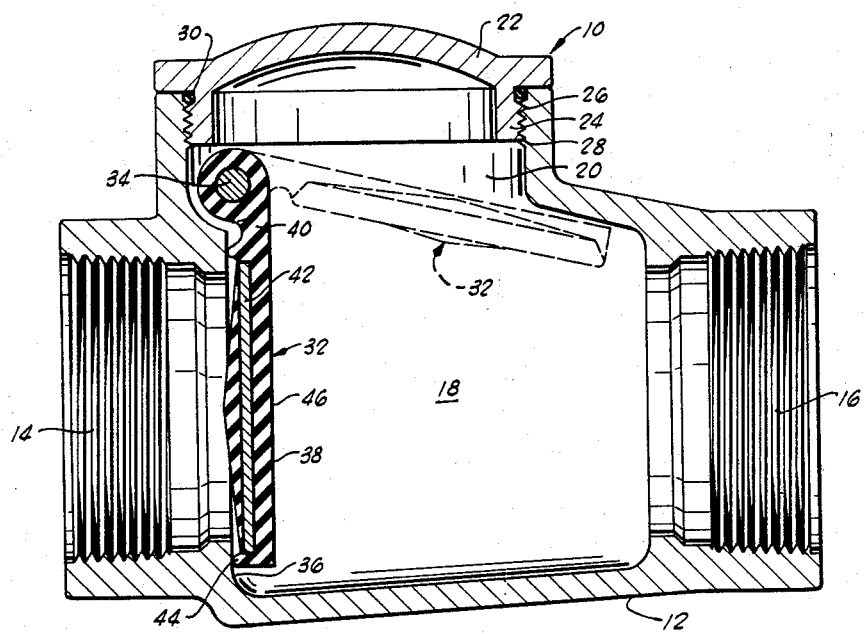
Fig. 1
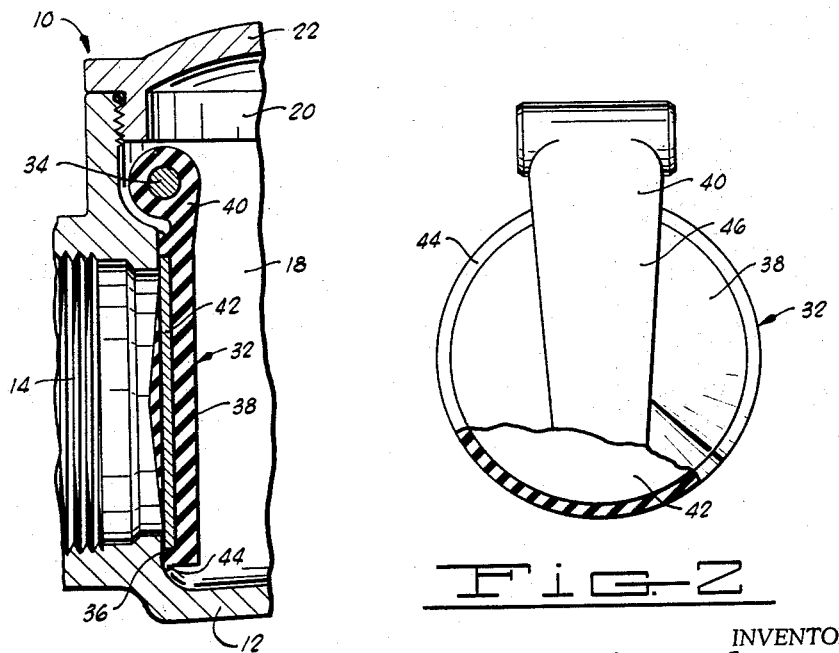
Fig. 2
Fig. 3
INVENTOR.
DOMER SCARAMUCCI
BY
Dunlap & Laney
ATTORNEYS Jan. 3, 1967  D. SCARAMUCCI  3,295,550
SWING-TYPE CHECK VALVE
Filed March 2, 1964  2 Sheets-Sheet 2

INVENTOR.
DOMER SCARAMUCCI
BY
Dunlap & Laney
ATTORNEYS

United States Patent Office 3,295,550
Patented Jan. 3, 1967

3,295,550
SWING-TYPE CHECK VALVE
Domer Scaramucci, 3245 S. Hattie,
Oklahoma City, Okla. 73129
Filed Mar. 2, 1964, Ser. No. 348,619
11 Claims. (Cl. 137—527.4)

This invention relates generally to swing-type check valves useful to control flow in fluid circuits. More particularly, but not by way of limitation, this invention relates to a swing-type check valve having a valve member flexibly connected with a pivot pin located in the valve.

Swing-type check valves constructed in the past generally include a valve member pivotally supported in the valve body on a pivot pin. Such valve members generally include a lower or seal portion sized to sealingly engage a seating surface in the valve body to prevent reverse flow of fluids through the valve. Most often, a connecting arm extends from the seal portion and encircles the pivot pin to pivotally support the seal portion, whereby the valve member can move out of the path of fluid flow through the valve.

Generally, the valve member is a relatively rigid unitary structure which may incorporate a resilient seal of some form on the seal portion to assure that the valve will be completely closed against reverse fluid flow. In high pressure swing-type check valves, the rigid structure of the valve member engages the valve seat to close the valve and to withstand the force exerted by the pressure in the system. With this arrangement, the pivot pin must be aligned with the valve seat with extreme accuracy. Even though closure may be obtained by a resilient seal mounted on the sealing portion, the rigid structure of the valve member must support the force exerted by the pressure. In the event that misalignment is present, a reverse pressure in the valve will tend to force the seal portion onto the seat, either by twisting the seal portion or by forcing the seal portion longitudinally, depending on the type of misalignment. In either event, substantial forces are generated to bend the portion connecting the seal portion to the pivot pin and to place the pivot pin in a bind. Either circumstance may result in complete valve failure and will reduce the service life of the valve. Repeated or extreme twisting or bending may result in breaking the connecting portion, or, if it has sufficient strength to resist such failure, the pivot pin may be worn or broken. In any event, the valve will be sluggish in operation and, in all likelihood, will never provide satisfactory service.

Failures of the foregoing type may be eliminated by maintaining extremely close tolerances during manufacture of the valve. However, the close tolerances required are difficult to hold in production and substantially increase valve costs. Due to the highly competitive nature of the valve industry, it is desirable to be able to manufacture an effective swing-type check valve without the necessity of holding such tolerances.

One other problem that is often encountered in swing-type check valves, and more particularly in the larger valve sizes, is that the valve member pivots very rapidly and is sufficiently heavy to exert a relatively high impact force on the valve seat. Also, when opening, the valve member may slam with considerable force against the valve body. The shock forces thus generated may beat out the seat and the body and may damage the valve member. While damage to the valve body and seat is of importance, it should also be pointed out that such forces are also transmitted throughout all parts of the valve member and to the pivot pin. After repeated operation, the valve member may fail at the point where the connecting portion joins the seal portion, due to the imposition of repeated shock forces.

It can be appreciated that a combination of the foregoing problems will produce failures more quickly. In relatively large valves that are produced by production line techniques, it can be reasonably assumed that the cause of such valve failures in service is due to the combination of twisting and impact forces.

Generally, this invention provides an improved swing-type check valve that includes a valve body having a chamber therein in communication with inlet and outlet passageways that are adapted to be connected in a fluid circuit. A valve member is pivotally supported in the chamber by a pivot pin located in the valve body. The valve member includes a seal portion which is adapted to close the valve against reverse fluid flow, and a connecting portion extending from the seal portion and cooperating with the pivot pin to pivotally support the valve member in the chamber. The connecting portion incorporates a resilient material to absorb shock and permit relative movement between the valve member and the pivot pin in the event misalignment is present in the valve.

One object of the invention is to provide an improved swing-type check valve that reduces the requirement for close tolerances between the pivot pin and the valve seat.

Another object of the invention is to provide an improved swing-type check valve that substantially absorbs the shock forces occurring in the valve without detrimental effect.

A further object of the invention is to provide an improved swing-type check valve that may be easily and economically manufactured.

Still another object of the invention is to provide an improved swing-type check valve that effectively closes at low and high pressures.

One other object of the invention is to provide an improved swing-type check valve that has an extended service life.

A still further object of the invention is to provide an improved valve member for use in swing-type check valves that can be easily and economically manufactured and will absorb the shock forces imposed during the operation of such valves.

The foregoing and additional objects and advantages of the invention will become more apparent as the following description is read in conjunction with the accompanying drawings wherein like reference characters denote like parts in all views, and wherein:

FIG. 1 is a cross-sectional view of a check valve constructed in accordance with the invention;

FIG. 2 is an enlarged elevation view of a valve member utilized in the check valve of FIG. 1;

FIG. 3 is a sectional view of a portion of the check valve of FIG. 1, but showing the valve member with pressure applied thereto;

Figure 4:
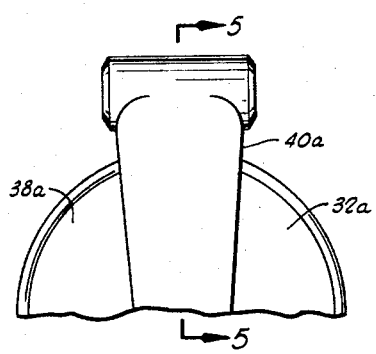
FIG. 4 is an elevation view of a portion of a modified form of the valve member of FIG. 2.

Referring now to the drawings, and in particular to FIG. 1, shown therein is a swing check valve generally designated by the reference character 10. The check valve 10 includes a valve body 12 having an inlet 14 and an outlet 16 communicating with a chamber 18 that is centrally located within the valve body 12. The inlet 14 and outlet 16 are illustrated as being provided with internal threads which are adapted to be secured to sections of a conduit (not shown).

An access port 20 extends from the chamber 18 through the top of the valve body 12. A bonnet 22 is provided to close the access port 20 and has a depending flange 24 which is provided with external threads 26 mating with interior threads 28 in the access port 20. An O-ring type seal 30 is positioned between the depending flange 24 of the bonnet 22 and the wall of the access port 20 to provide a fluid-tight seal, thus preventing fluid from escaping from within the chamber 18.

A valve member 32 is disposed in the chamber 18 and is pivotally supported therein by a hinge or pivot pin 34. In one position, the valve member 32 is disposed adjacent to, and adapted to make sealing contact with, a valve seat 36 surrounding the valve inlet 14. The valve member 32 is provided with a seal portion 38 and a connecting portion 40 which extends from the seal portion 38 and cooperates with the pivot pin 34 to pivotally support the valve member 32 in the check valve 10. A disc-like reinforcing member 42 is located in the seal portion 38 of the valve member 32 and is sized to engage the valve seat 36. The valve member 32 is comprised generally of a mass of resilient material such as rubber, synthetic rubber, or plastic. The resilient material encompasses the reinforcing member 42, providing a pressure responsive bead 44 which extends peripherally about the reinforcing member 42. As shown in FIG. 1, the pressure responsive bead 44 extends from the valve member 32 toward the inlet 14 so that the bead 44 will engage the valve seat 36 prior to engagement thereof by the reinforcing member 42. The valve member 32 also includes a backing strip 46, which may be more clearly seen in FIG. 2. The backing strip 46 is provided to reinforce the connecting portion 40 (of which it is an extension) and also to serve as a bumper when the valve member 32 is in the open position. The connecting portion 40, which is formed of resilient material, permits relative movement between the seal portion 38 and the pin 34, as described more fully hereinafter. In addition, the resiliency of the connecting portion 40 retains the various parts of the valve member 32 in the arrangement shown, thereby precluding inconsistent valve operation as might occur if the connecting portion were constructed of a highly flexible material.

With the inlet 14 and outlet 16 connected to sections of a conduit (not shown) and fluid flowing through the valve 10 from the inlet 14 to the outlet 16, the valve member 32 will move pivotally about the pin 34 to a position as shown by dash lines in FIG. 1. With the valve member 32 in this position, it can be seen that the passageway through the valve 10 is completely unobstructed and therefore offers minimum resistance to fluid flowing therethrough. Should fluid cease to flow through the valve 10, the valve member 32 will gravitate to the position shown by the solid lines of FIG. 1, wherein the pressure responsive bead 44 makes an initial contact with the valve seat 16, closing the passageway through the check valve 10. As the pressure differential increases from the outlet 16 to the inlet 14, it can be seen in FIG. 3 that the valve member 32 will move laterally toward the valve seat 36 until the reinforcing member 42 engages the seat 36. In this position, the pressure responsive sealing bead 44 has been mechanically deformed outwardly and is physically trapped by the engagement of the reinforcing member 42 with the seat 36. Further increases in pressure from the outlet 16 will force the valve member 32 into tighter engagement with the valve seat 36, thereby augmenting the fluid-tight seal which has been formed by the initial contact between the pressure responsive bead 44 and the valve seat 36.

Assembly of the check valve 10 may be performed in one of several different ways. As illustrated in FIG. 1, the check valve 10 is of the full bore type, i.e., the bore through the valve 10 is substantially the same as the outlet from the valve. When the passageway through the valve 10 is of this size, the valve member 32 will necessarily be larger than the outlet 16 into the valve and therefore cannot be inserted through the outlet 16. As previously described, an access port 20 has been provided in the valve body 12. With the bonnet 22 removed, the valve member 32 may be inserted into the chamber 18 of the valve body 12, and the pin 34 inserted through the valve body and through the valve member 32 to secure the valve member 32 therein. The bonnet 22, with the O-ring 30 thereon, is then screwed into the threads 28 of the access port 20 until the O-ring 30 is compressed, preventing fluid from escaping through the port 20 from the chamber 18. Although not illustrated, it should be apparent that should a very small opening through the valve seat 36 be provided, the valve member 32 may be of such size that it can be inserted through the outlet 16. In such an instance, it is not necessary to provide the access port 20 or the bonnet 22 therefor. The valve member 32 would simply be inserted through the outlet 16, held against the valve seat 36, and the pin 34 inserted through the valve body 12 and the valve member 32 to pivotally support the valve member 32 in the chamber 18.

As illustrated, the connecting portion 40 of the valve member 32 is constructed entirely of a resilient material. Constructing the connecting portion 40 in this manner provides two very important features in the operation of the check valve 10. Should the pivot pin 34 be misaligned with respect to an axis extending through the valve seat 36, so that the valve member 32 would not approach the valve seat in a plane parallel thereto, the connecting portion 40 can flex or twist to permit the seal portion 38 to adapt itself to the plane of the valve seat 36. The ability to twist or move as described will prevent failure of the connecting portion 40 which may occur in the presently available check valves wherein the connecting portion is constructed of a non-flexible material. The flexibility of the connecting portion 40 also permits the seal portion 38 and the pressure responsive bead 44 thereon to form a fluid-tight seal with the valve seat 36 in the event the pivot pin is displaced either forwardly or rearwardly with respect to the valve seat 36. Such a feature is illustrated in some degree in FIG. 3, wherein it can be observed that the connecting portion 40 is distorted slightly by the movement of the seal portion 38 toward the valve seat 36 to compress the pressure responsive bead 44 as the reinforcing member 42 engages the valve seat 36. If such movement should occur in a solidly connected valve member, it will be appreciated that the connecting portion will be placed in a bending stress condition, and after repeated operation will, in all likelihood, fail where the connecting portion joins the seal portion.

As previously pointed out, misalignment of any type may place severe stresses or wear on the pivot pin 34. It can be appreciated that with the resilient connecting portion 40 provided herein, very little if any stress will be placed on the pin 34, permitting the valve to operate smoothly and for extended periods of time without wear or breakage of the pivot pin 34. Also, as previously mentioned, the valve member 32 may operate very rapidly from the open to the closed position, thereby imposing severe shock loading both on the valve body 12 and on the valve member 32. The use of the resilient connecting portion 40 provides a means of absorbing a considerable amount of that shock within the valve member 32 and isolating it so that it does not reach the pivot pin 34. The projecting pressure responsive bead 44 also aids in preventing the valve seat 36 from being damaged by repeated operations, and the backing strip 46 aids in preventing damage to the valve body 12 as the valve member 32 is opened violently and slammed against the valve body 12.

Figure 5:
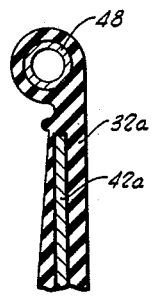
FIG. 5 is a cross-sectional view of the modified valve member of FIG. 4 taken along the line 5—5 of FIG. 4.

A slightly modified version of the valve member 32 is illustrated in FIGS. 4 and 5, and is designated generally by the reference character 32a. The valve member 32a includes a seal portion 38a and a resilient connecting portion 40a which are in all respects identical to the seal portion 38 and the connecting portion 40, respectively, of the valve member 32. The valve member 32a includes a reinforcing member 42a which corresponds to the reinforcing member 42 of the valve member 32. A sleeve 48, formed of metal or other long wearing material, is provided in the connecting portion 40a and serves to cooperate with the pivot pin 34 to pivotally mount the valve member 32a in the check valve 10. Under certain operating conditions, it may be desirable to provide the valve member 32 with the reinforcing sleeve 48 to provide a freer and longer operating life for the check valve 10. Other than the provision of the reinforcing sleeve 48, the valve member 32a, when installed in the check valve 10, is constructed as described with respect to the valve member 32.

Figure 6:
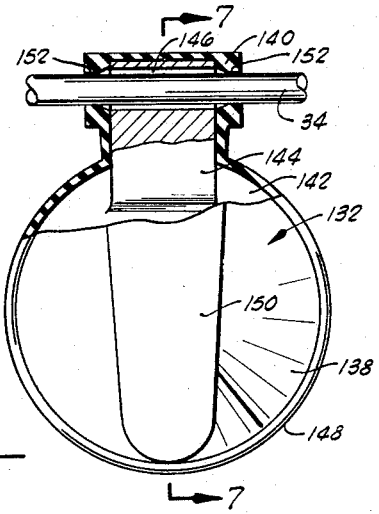
FIG. 6 is an elevation view, partly in cross-section, of another form of valve member.
Figure 7:
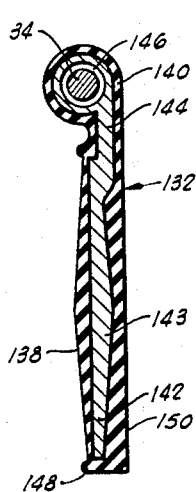
FIG. 7 is a cross-sectional view of the valve member of FIG. 6 taken along the line 7—7 of FIG. 6.

FIGS. 6 and 7 illustrate another form of valve member which is generally designated by the reference character 132. As illustrated, the valve member 132 includes a seal portion 138 and a connecting portion 140. A relatively rigid reinforcing member 142 is incorporated in the valve member 132 and has a disc-like lower portion 143 positioned in the seal portion 138, and an arm portion 144 extending through the connecting portion 140 and terminating at its upper end in a sleeve providing a bore 146. As illustrated in FIG. 6, the bore 146 is of slightly larger diameter than the outside diameter of the pivot pin 34. The valve member 132 is substantially encased in a resilient material which provides a pressure responsive sealing bead 148 encircling the lower portion 143 of the reinforcing member 142, and a backing strip 150 which is located on the side of the valve member 132 similarly to the backing strip 46 of the valve member 32, and serves a similar purpose. The resilient material also extends around the arm portion 144 of the reinforcing member 142 and provides a pair of inwardly extending flange portions 152 which engage the pivot pin 34 on either side of the bore 146.

Operationally, the valve member 132 is installed in the check valve 10 as described with respect to the valve member 32, and performs in a very similar manner to open and close the passageway through the check valve 10. The function of the pressure responsive sealing bead 148 is identical to that of the pressure responsive bead 44 and operates in conjunction with the valve seat 36 to provide a fluid-tight closure of the check valve 10. Misalignment between the pivot pin 34 and the valve seat 36 is compensated for in the valve member 132 by the resilient flange portions 152 which are in engagement with the pin 34. While the reinforcing member 142 extends throughout the valve member 132, it should be pointed out that the upper portion of the arm 144 provides a bore 146 which is of larger diameter than the pin 34, thereby allowing relative movement between the valve member 132 and the pivot pin 34 due to the ability of the resilient flanges 152 to flex. As can be appreciated from observing FIG. 6, the valve member 132 can move almost universally, within a limited amount, with respect to the pivot pin 34. Thus, it can be appreciated that while a very rigid valve member 132 is provided (due to the extent of the reinforcing member 142), the valve member 132 still retains the resiliency required to absorb both shock loadings and misalignment without resulting in a valve failure.

Figure 8:
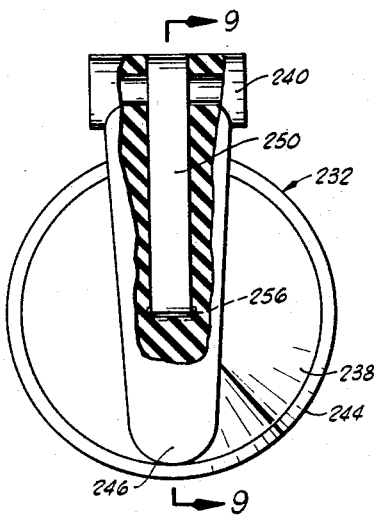
FIG. 8 is an elevation view, partly in cross-section, of an additional form of valve member; and, FIG. 9 is a cross-sectional view of the valve member of FIG. 8 taken along the line 9—9 of FIG. 8.
Figure 9:
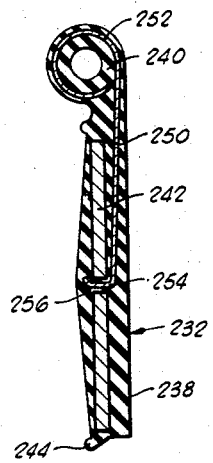

Another version of a valve member is illustrated by FIGS. 8 and 9, and is generally designated by the reference character 232. The valve member 232 includes a seal portion 238 and a connecting portion 240. A relatively rigid disc-like reinforcing member 242 is located in the seal portion 238. A relatively rigid reinforcing arm 250 extends through a portion of the seal portion 238 and into the connecting portion 240, having its upper end 252 adapted to encircle the pivot pin 34 when the valve member 232 is installed in the check valve 10. The lower end portion 254 of the reinforcing arm 250 extends into an opening 256 provided in the reinforcing member 242. The opening 256 is slightly larger than the lower end portion 254 of the reinforcing arm 250. The valve member 232 is substantially encompassed by a resilient member 232, as was the valve member 32, and provides resilient material within the opening 256 to flexibly interconnect the lower portion 254 of the arm 250 with the disc 242. The valve member 232 is also provided with a pressure responsive sealing bead 244 which extends about the periphery of the reinforcing member 242 in a manner similar to the pressure responsive bead 44 in the valve member 32.

When the valve member 232 is installed in the check valve 10, the operation of the pressure responsive sealing bead 244 with respect to forming a seal with the valve seat 36 is substantially identical to that previously described with respect to the other forms of valve members. Again, however, the method of absorbing the shock of opening and closing and the twisting loads which may occur in the instance of misalignment between the pin 34 and the valve seat 36, is slightly different in the valve member 232. Relative movement between the pivot pin 34 and the connecting portion 240 with the seal portion 238 is afforded by the resilient material interconnecting the lower portion 254 of the reinforcing arm 250 and the reinforcing disc 242. Due to the reinforcing material interposed in the opening 256 in the disc 242, it can be appreciated that the seal portion 238 can move relative to the arm 250 and the connecting portion 240 in which it is mounted. It should also be pointed out that the valve member 232 may be used in relatively high pressure service without fear of extrusion of the resilient material through the opening 256, because a backing strip 246 is provided on the valve member 232 which locates a substantial thickness of resilient material over the opening 256, thereby resisting extrusion through the opening 256.

From the foregoing detailed description it can be seen that each of the valve members provides a means of permitting relative movement between the seal portion of the valve member and the pivot pin which pivotally supports the valve member in the check valve. The provision of such relative movement is extremely important in that the valve can be manufactured by production line techniques without the necessity of holding extremely close tolerances between the pivot pin 34 and the valve seat surface 36. It should also be pointed out that each of the valve members herein described can be manufactured by a molding process which also aids in reducing the overall cost of the valve. Furthermore, each of the valve members described provides a resilient portion which will absorb the shocks imposed by repeated and rapid operation of the check valve and will serve to prevent damage, not only to the valve member, but also to the valve body and valve seat. While only the pressure responsive sealing bead has been described in detail, it should be understood that any form of sealing bead may be provided on the valve members without affecting the operation thereof. However, the pressure responsive bead is the preferred form because it will provide an initial mechanical seal at very low differential pressures, and due to the entrapment of the seal by the reinforcing members and the valve seat, may operate successfully at relatively high pressures.

It should be understood that the embodiments described herein are by way of example only and that many modifications and variations therein can be made without departing from the spirit of the invention or from the scope of the annexed claims.

What I claim is:
1. A check valve comprising:
   a valve body having a chamber therein and having an inlet passageway and an outlet passageway extending into said chamber;

means forming a valve seat in said chamber surrounding said inlet passageway;
a pivot pin mounted in said valve body and extending across a portion of the chamber; and,
a valve member located in said chamber and pivotally mounted on said pin, said valve member including:
a seal portion engageable with said valve seat to close said inlet passageway,
a reinforcing member in said seal portion sized to engage said valve seat, and
connecting means extending from said seal portion and encircling said pin for journaling the valve member on said pin and having resilient means interposed therein, whereby said seal portion can move relative to said pin to compensate for misalignment between said pin and said seat.

2. The check valve of claim 1 wherein said reinforcing member has an aperture located therein, and wherein said valve member also includes:
a relatively rigid reinforcing member in said connecting means having one end portion disposed in the aperture in said reinforcing member; and,
a resilient mass substantially encompassing said valve member, whereby said reinforcing members are flexibly interconnected.

3. The check valve of claim 1 wherein said valve member includes:
a relatively rigid reinforcing member in said connecting means rigidly joined to the reinforcing member in said seal portion; and,
a resilient mass substantially encompassing said valve member and extending between said pin and said relatively rigid reinforcing member in said connecting means, whereby said seal portion can move relative to said pin to compensate for misalignment therebetween.

4. The check valve of claim 1 wherein said connecting means comprises a mass of resilient material.

5. The check valve of claim 4 wherein said connecting means includes a relatively rigid tubular member encircling said pin.

6. The check valve of claim 1 wherein said seal portion includes:
a resilient mass encompassing said reinforcing member; and,
a pressure responsive bead extending about the periphery of said reinforcing member and projecting therefrom toward said valve seat, whereby said bead engages said seat prior to the engagement thereof by said reinforcing member.

7. In a check valve including a valve body having a pivot pin mounted therein and a valve seat surrounding a flow passageway, the improvement comprising:
a valve member adapted to be pivotally supported in the valve body, said valve member having
a seal portion adapted to sealingly engage the valve seat,
a resilient connecting portion integral with the seal portion and extending from said seal portion, said connecting portion having a bore therein for receiving the pivot pin to journal said valve member on the pivot pin and permit the seal portion to align itself with the valve seat, and
a reinforcing member in said seal portion sized to engage said valve seat.

8. In a check valve including a valve body having a pivot pin mounted therein and a valve seat surrounding a flow passageway, the improvement comprising:
a valve member adapted to be pivotally supported in the valve body, said valve member having
a seal portion adapted to sealingly engage the valve seat,
a connecting portion extending from said seal portion and adapted to be journaled on said pivot pin to pivotally support said valve member in the valve body,
a reinforcing member in said seal portion sized to engage said valve seat and extending within said connecting portion to encircle the pivot pin; and resilient means interposed between said connecting means and the pivot pin, whereby said seal portion can move relative to the pivot pin.

9. In a check valve including a valve body having a pivot pin mounted therein and a valve seat surrounding a flow passageway, the improvement comprising:
a valve member adapted to be pivotally supported in the valve body, said valve member having
a seal portion adapted to sealingly engage the valve seat,
a rigid reinforcing member in said seal portion and having an aperture therein,
a connecting portion extending from said seal portion and adapted to cooperate with the pivot pin to pivotally support the valve member in the valve body,
a rigid reinforcing member in said connecting portion and having one end thereof extending into said aperture and having the other end thereof encircling the pivot pin, and
a resilient mass substantially encompassing said valve member and flexibly interconnecting said reinforcing members, whereby said seal portion can move relative to the pivot pin.

10. A valve member for use in a swing-type check valve comprising:
a unitary rigid reinforcing member forming a seal portion for closing said valve and a connecting portion having a bore therein for pivotally supporting said valve member; and,
a resilient mass substantially encompassing said reinforcing member and extending within said bore to provide flexibility in the connecting portion.

11. A valve member for use in a swing-type check valve comprising:
a seal portion for closing said valve;
a reinforcing member in said seal portion having an aperture therein;
a connecting portion for pivotally supporting said valve member in the check valve;
a reinforcing member in said connecting portion having one end disposed in said aperture; and,
a resilient mass substantially encompassing said valve member and flexibly interconnecting said reinforcing members.

References Cited by the Examiner
UNITED STATES PATENTS

| | | | |
|---|---|---|---|
| 2,800,920 | 7/1957 | Smith | 137—525.3 |
| 2,981,282 | 4/1961 | Mack | 137—516.29 |
| 3,058,487 | 10/1962 | Helling | 137—516.19 |
| 3,060,961 | 10/1962 | Conley | 137—527.4 |
| 3,152,608 | 10/1962 | Morrison | 137—525.3 |

ALAN COHAN, *Primary Examiner.*

WILLIAM F. O'DEA, *Examiner.*

H. COHN, *Assistant Examiner.*